United States Patent
Vogt et al.

(10) Patent No.: US 11,669,789 B1
(45) Date of Patent: Jun. 6, 2023

(54) VEHICLE MASS DETERMINATION

(71) Applicant: GM Cruise Holdings LLC, San Francisco, CA (US)

(72) Inventors: Kyle Vogt, San Francisco, CA (US); Daniel Kan, San Francisco, CA (US); Lukas Holoubek, San Francisco, CA (US)

(73) Assignee: GM Cruise Holdings LLC., San Francisco, CA (US)

( * ) Notice: Subject to any disclaimer, the term of this patent is extended or adjusted under 35 U.S.C. 154(b) by 305 days.

(21) Appl. No.: 16/836,772

(22) Filed: Mar. 31, 2020

(51) Int. Cl.
| | |
|---|---|
| *G01G 19/02* | (2006.01) |
| *G06N 5/04* | (2023.01) |
| *G06N 20/00* | (2019.01) |
| *G01S 17/88* | (2006.01) |

(52) U.S. Cl.
CPC .............. *G01G 19/02* (2013.01); *G01S 17/88* (2013.01); *G06N 5/04* (2013.01); *G06N 20/00* (2019.01)

(58) Field of Classification Search
CPC .......... G01G 19/02; G06N 20/00; G06N 5/04; G01S 17/88
USPC .......................................................... 702/173
See application file for complete search history.

(56) References Cited

U.S. PATENT DOCUMENTS

| | | | | |
|---|---|---|---|---|
| 8,983,752 | B2 * | 3/2015 | Harvie ................. | G01G 19/086 701/99 |
| 2004/0193386 | A1 * | 9/2004 | Flynn .................... | G06F 17/175 702/173 |
| 2008/0013790 | A1 * | 1/2008 | Ihara ..................... | G06V 20/56 382/104 |
| 2008/0136676 | A1 * | 6/2008 | Yano .................... | G01G 23/005 340/666 |
| 2009/0322878 | A1 * | 12/2009 | Ishii ........................ | B60R 1/00 348/148 |
| 2013/0054107 | A1 * | 2/2013 | Harvie ................. | G01G 19/086 701/99 |
| 2013/0161110 | A1 * | 6/2013 | Furst .................... | A47C 31/126 297/217.2 |
| 2014/0190753 | A1 * | 7/2014 | Mian .................... | G01G 23/002 177/136 |
| 2017/0199040 | A1 * | 7/2017 | Willis ................... | G01S 19/393 |

(Continued)

FOREIGN PATENT DOCUMENTS

| | | | | |
|---|---|---|---|---|
| DE | 102010062589 | * | 6/2012 | .......... G01B 11/026 |
| EP | 3336493 A1 | | 6/2018 | |
| GB | 2592066 A | | 8/2021 | |

OTHER PUBLICATIONS

International Search Report and Written Opinion for Application No. PCT/US2021/025026, dated Jul. 14, 2021, 8 Pages.

(Continued)

*Primary Examiner* — Kerri L McNally
*Assistant Examiner* — Thang D Tran
(74) *Attorney, Agent, or Firm* — Polsinelli PC (57) ABSTRACT

The subject disclosure relates to ways to determine the mass of a vehicle, such as an autonomous vehicle (AV), based on the vehicle pose. In some aspects, a method of the disclosed technology includes steps for measuring a first pose of a vehicle using one or more environmental sensors, measuring a second pose of the vehicle using the one or more environmental sensors, and calculating a mass of the vehicle based on the first pose and the second pose. Systems and machine-readable media are also provided.

20 Claims, 6 Drawing Sheets

(56) References Cited

U.S. PATENT DOCUMENTS

| | | | | |
|---|---|---|---|---|
| 2017/0364926 | A1* | 12/2017 | Crawford | G06Q 50/28 |
| 2018/0045556 | A1* | 2/2018 | Imagawa | G06T 7/70 |
| 2018/0120147 | A1* | 5/2018 | Hall | G01G 19/02 |
| 2018/0170395 | A1* | 6/2018 | Luo | G05D 1/0088 |
| 2018/0308191 | A1* | 10/2018 | Matthiesen | G01C 21/3438 |
| 2018/0357484 | A1* | 12/2018 | Omata | G06V 20/582 |
| 2019/0232974 | A1* | 8/2019 | Reiley | G06V 20/597 |
| 2019/0285501 | A1* | 9/2019 | Jensen | B60T 8/3205 |
| 2020/0023811 | A1* | 1/2020 | Herman | G01G 19/414 |
| 2020/0055521 | A1* | 2/2020 | Pearson | B60W 40/13 |
| 2020/0209867 | A1* | 7/2020 | Valois | G01C 21/3848 |
| 2020/0241564 | A1* | 7/2020 | Goldman | G06N 20/00 |
| 2020/0290217 | A1* | 9/2020 | Chernyak | B25J 19/002 |
| 2020/0327696 | A1* | 10/2020 | Habib | G01S 17/89 |
| 2020/0394445 | A1* | 12/2020 | Han | G06V 20/56 |
| 2021/0004929 | A1* | 1/2021 | Sawahashi | G08G 1/202 |
| 2021/0053570 | A1* | 2/2021 | Akella | G05D 1/0088 |
| 2021/0254988 | A1* | 8/2021 | Styles | G07C 5/08 |
| 2021/0362758 | A1* | 11/2021 | Bambrogan | E01F 13/12 |

OTHER PUBLICATIONS

International Preliminary Report on Patentability for Application No. PCT/US2021/025026, dated Oct. 13, 2022, 7 pages.

* cited by examiner

VEHICLE MASS DETERMINATION

BACKGROUND

1. Technical Field

The subject technology relates to solutions for measuring vehicle mass and in particular, for identifying mass changes based on changes in automobile pose.

2. Introduction

Autonomous vehicles (AVs) are vehicles having computers and control systems that perform driving and navigation tasks that are conventionally performed by a human driver. As AV technologies continue to advance, ride-sharing services will increasingly utilize AVs to improve service efficiency and safety. However, for effective use in ride-sharing deployments, AVs will be required to perform many of the functions that are conventionally performed by human drivers, such as performing navigation and routing tasks necessary to provide a safe and efficient ride service. Such tasks may require the collection and processing of large quantities of data using various sensor types, including but not limited to cameras and/or Light Detection and Ranging (LiDAR) sensors disposed on the AV.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Ride sharing and dispatch services can be better optimized when vehicle capacities can be correctly matched with cargo weights. For example, in ride-sharing deployments, smaller vehicles may be dispatched to pick-up solo riders, or those without luggage requirements, whereas larger (higher capacity) vehicles may be reserved for instances where heavier loads need to be transported. One barrier to optimizing vehicle-to-rider matching is the ability to quickly determine vehicle mass. Although systems, e.g., gross vehicle weight (GVW) sensors can be used to make weight determinations, the measurements performed by such systems are based on vehicle dynamics that require the vehicle be driven before accurate mass calculations can be performed. These limitations make legacy GVW systems poor candidates for deployment in retail ride-sharing applications where vehicle loads are frequently changing and where vehicle motion cannot be used without negatively impacting user experience.

Aspects of the disclosed technology provide solutions for determining vehicle mass based on vehicle pose, without the need for registering vehicle dynamics (e.g., without the need to drive the vehicle). As used herein, vehicle pose is used to describe vehicle orientation in three-dimensional (3D) space. For example, clearance distances at different locations on the vehicle can be indicative of vehicles pose. As such, vehicle pose can provide a useful proxy for making inferences regarding total mass loads and mass distributions associated with a given vehicle. As discussed in further detail below, mass determinations can be made by registering changes to vehicle pose using various environmental sensors, including but not limited to Light Detection and Ranging (LiDAR) sensors, and/or cameras, etc.

Additionally, some aspects of the technology address solutions for improving vehicle routing and dispatch by using fleet-wide vehicle mass statistics, for example, to make predictions regarding vehicle capacity requirements. By accurately predicting weight requirements for various users/riders, fleet-wide vehicle dispatch can be improved by properly matching vehicle capacities with rider requirements.

Figure 1:
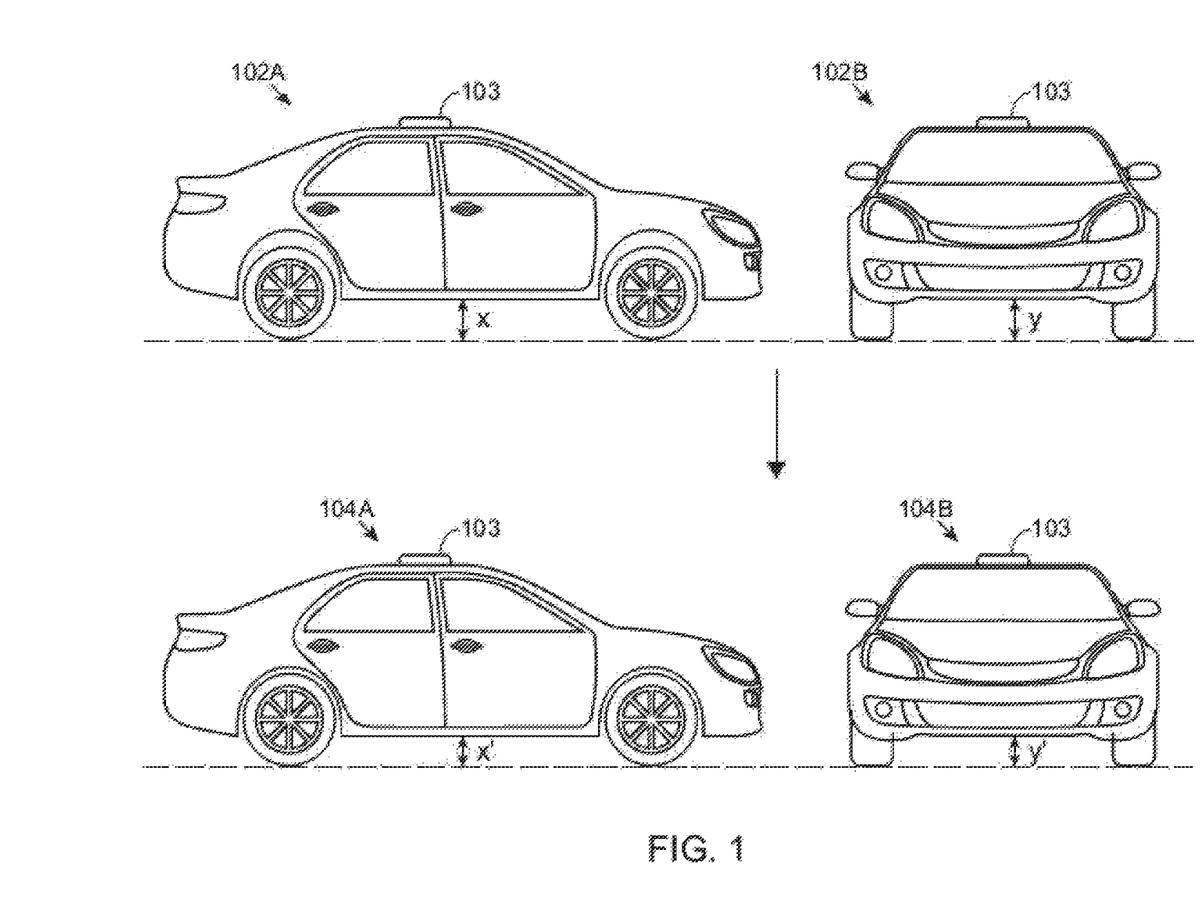
FIG. 1 conceptually illustrates how a vehicle pose can be used to calculate vehicle mass, according to some aspects of the disclosed technology.

FIG. 1 conceptually illustrates how changes to vehicle pose (e.g., tilt and pitch) can be used to determine vehicle mass, according to some aspects of the disclosed technology. In the illustrated example, a vehicle, such as an autonomous vehicle (AV), is represented under different mass conditions (102, 104). Under a first mass condition (102), such as when passengers are absent from the vehicle cabin, the AV is shown from side and front perspectives 102A, 102B, respectively. In side-perspective 102A, a clearance measured from the bottom of the vehicle is indicated by distance X, whereas in end-perspective 102B, a clearance is indicated as distance Y. These clearance distances can be used to represent a tilt and pitch of the AV, respectively. Clearance distances (X, Y) change in relation to vehicle mass and mass distribution, for example, in relation to different loads carried by the, as well as where those loads are placed within the AV. For example, under second mass condition 104, a side-perspective of the AV (104A) has a clearance distance of X', whereas the front-perspective (104B) has a clearance distance of Y'.

As used herein, distances (X, X', Y, Y') are understood to indicate changes in AV pose with respect to the surrounding environment. In this example, changes are measured with respect to a reference frame provided by the ground, however other measurements between the AV and a surrounding environment can be used to determine vehicle pose without departing from the scope of the disclosed technology. By way of example, changes in vehicle pose may be measured using sensors 103, with respect to any environmental object, such as a building or a sensor calibration feature, etc. Additionally, comparisons between multiple sensor measurements can be used to register changes to vehicle pose (e.g., tilt and/or pitch). By way of example, weight added to a front-passenger seat of the AV may cause changes to a vehicle pose that are detected by one or more sensors 103, but that are not detected by others. In such instances, comparisons between sensor readings may be used to infer changes to vehicle pose that correspond with dynamic changes to total mass and/or mass distribution.

In practice, vehicle pose, such as clearance distances (X, X', Y, Y'), can be registered using one or more environmental sensors (e.g., sensors 103) mounted to the AV. In the depicted example, environmental sensors 103 are shown as mounted to a top-surface of the vehicle, however, other mounting locations are contemplated, without departing from the scope of the disclosed technology. By way of example, one or more sensors may be mounted to a side and/or bottom surface of the AV. Furthermore, environmental sensors 103 may include a variety of sensor types, including but not limited to one or more Light Detection and Ranging (LiDAR) sensors, and/or cameras.

Changes to vehicle pose can be correlated with vehicle weight and weight distribution. As such, as passengers and/or cargo etc. are added or removed from the AV cabin, or moved around within the cabin, pose measurements registered by sensors 103 can be used to generate and/or update a vehicle mass model. As discussed in further detail below, the vehicle mass model can be used to calculate a total vehicle mass based on the vehicle pose detected by environmental sensors 103.

Figure 2:
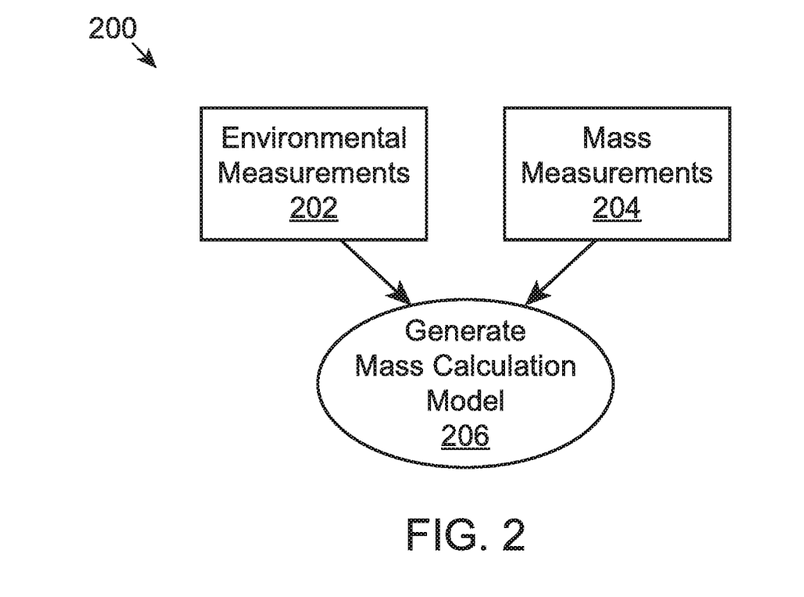
FIG. 2 illustrates a block diagram of an example system that can be used for generating a mass model that can be used to calculate vehicle mass based on vehicle pose, according to some aspects of the disclosed technology.

FIG. 2 illustrates a conceptual block diagram of an example system 200 that can be used for generating a mass model to calculate vehicle mass based on vehicle pose, according to some aspects of the disclosed technology. System 200 comprises environmental sensors 202 and a repository of mass measurements 204. It is understood that environmental sensors 202 can represent a repository (e.g., a database) of pose measurements for one or more AVs. Similarly, mass measurements 204 can represent measures of vehicle mass for one or more AVs, for example, as cargo loads are varied.

In practice, correlations between vehicle pose, as measured by environmental sensors 202, can be correlated with vehicle weights. Such correlations can be used to identify relationships between vehicle cargo loads and mechanical displacements in the vehicle, for example, as measured by one or more LiDAR and/or camera sensors. In some aspects, statistical correlations between AV pose and total mass can be used to generate one or more mass models 206. As used herein, mass models may be uniquely generated for a specific vehicle or vehicle type. Alternatively, mass models may be generated through correlations between pose and mass measurement for different vehicle types, for example, so that mass model 206 may be generalized for use across an entire fleet or fleet subset, e.g., based on vehicle type or other common characteristics. As discussed in further detail below, machine-learning techniques may be used to update or continuously train vehicle mass model 206, for example, as vehicle weight characteristics and pose data continue to be collected across the AV fleet.

Figure 3:
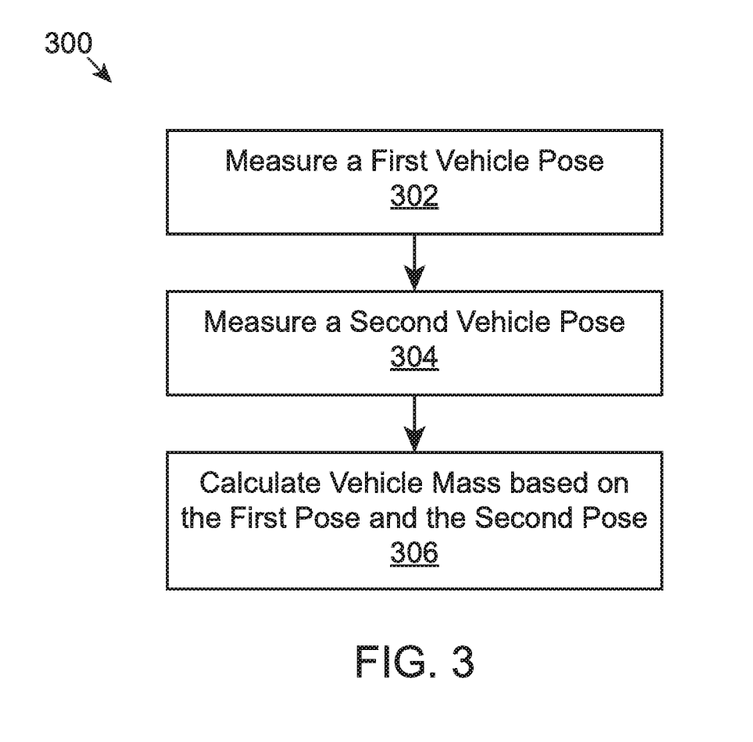
FIG. 3 illustrates steps of an example process for performing a vehicle mass calculation, according to some aspects of the disclosed technology.

FIG. 3 illustrates steps of an example process 300 for performing a vehicle mass calculation, according to some aspects of the disclosed technology. Process 300 begins with step 302 in which a first vehicle pose is measured, for example, with respect to an autonomous vehicle (AV). The first pose can correspond with a first vehicle mass associated with the AV. By way of example, the first vehicle mass may be based on an empty AV cabin, i.e., where no passengers are present and where the entire vehicle mass and corresponding pose are attributable to the weight and weight-distribution of the vehicle. As used herein, the first vehicle pose can represent a composite of different vehicle position measurements taken under similar mass and/or mass distribution conditions of the AV. As such, the first vehicle pose can represent an average vehicle position (e.g., tilt, roll), for a total vehicle mass resulting only from the vehicle's weight.

As discussed above, vehicle pose can be determined using various environmental sensors, such as one or more vehicle-mounted LiDAR sensors and/or cameras. However, in some aspects, vehicle pose may also be determined using (or aided by) sensors not located on the AV, such as, based on measurements taken from sensors disposed on another vehicle or as part of an external calibration system. Vehicle pose can be determined based on distances between the vehicle (AV) and one or more reference points, such as the ground and/or other objects in the surrounding environment. By way of example, vehicle pose can be measured based on a compression of the vehicle's suspension systems. As such, vehicle pose may be a function of one or more spring constants (K) for various portions of the vehicle's suspension.

In step 304, a second vehicle pose is measured, for example, under different mass conditions resulting from the addition of one or more passengers (or cargo) to the vehicle. As such, the second pose can correspond with a second vehicle mass associated with the AV. Depending on the desired implementation, changes in vehicle mass can also be due to any number of other factors, including controlled changes to carry weight for calibration purposes (e.g., for generating a vehicle mass model), and/or based on changes in vehicle passengers and/or cargo, for example, during AV deployment as a part of a ride sharing service. Similar to the first pose measurement in step 302, the second pose measurement can represent a composite of multiple vehicle positions (e.g., tilt and/or roll changes) that are taken while the vehicle under the influence of the second (changed) mass conditions.

In some approaches, a mass model is generated based on measurements of the first pose (step 302), and the second pose (step 304). Generation of the mass model can include the modification (updating) of an existing model, based on the first pose and second pose. For example, by correlating different vehicle poses with different vehicle mass weights, the mass model can be used to determine new vehicle weights and weight distributions as loads in the AV change. In some aspects, new mass determinations can be made in near real-time, for example, as passengers enter or disembark from the vehicle, and before the vehicle continues to a next destination, as discussed in step 306.

Specifically, in step 306, a third vehicle mass associated with the vehicle can be calculated based on the first and second pose. That is, a third (possibly unknown) vehicle mass can be determined based on a mass model generated from the first vehicle mass/pose and second vehicle mass/pose pairs described in steps 302 and 304. Further to the above example, the third vehicle mass condition may be created by changes to passengers and/or cargo carried by the AV. As discussed in further detail below, mass models may be updated as additional pose and mass measurements are received. That is, mass models may be periodically updated through the performance of additional calibration steps and/or done based on measurements collected during a ride-service deployment.

In some aspects, mass models can be used to provide vehicle capacity warnings, such as by providing indications of total or remaining vehicle capacity. For example, a ride-sharing service may provide sharing capabilities based on dynamically updated measures of vehicle weight. As passengers are added or removed from the AV (e.g., as pick-ups and drop-offs are completed) weight measurements can be updated and used to determine whether certain (future) pick-ups are possible. That is, changes to vehicle weight may be used to change routing and dispatch decisions, as discussed in further detail below. Additionally, vehicle mass calculations can be used to trigger user/rider notifications, e.g., to a smart phone or other device, for example, to indicate a maximum remaining vehicle capacity that can be allocated to the user. Such notifications may help riders to plan the use of ride services, for example, when traveling as a group or when transporting weighty items, such as luggage or groceries, etc.

In some embodiments, routing data (including rider profile data) may be used in conjunction with the vehicle mass model to make predictions about a required vehicle capacity. For example, vehicle mass measurements for rides taken to (or from) certain locations can be used to inform predictions about vehicle capacities that may be needed for subsequent (future) rides. Additional mass measurements can be used to update the predictive models used for AV dispatch. As such, the vehicle mass determination methods of the disclosed technology can enable improvements in AV vehicle dispatch on a fleet-wide basis.

Figure 4:
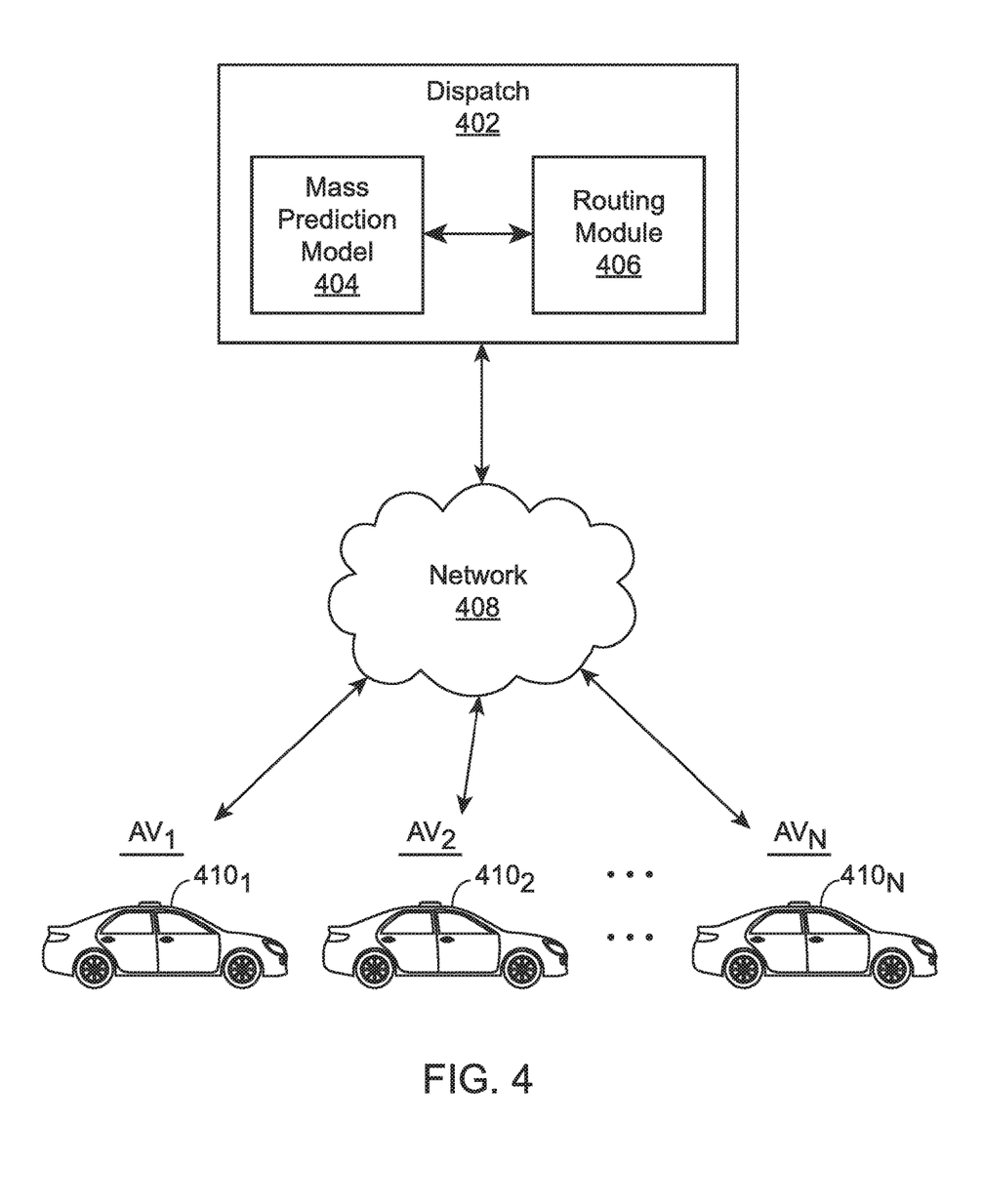
FIG. 4 illustrates an example system environment that can be used to facilitate routing and dispatch using a mass prediction model, according to some aspects of the disclosed technology.

FIG. 4 illustrates an example system environment 400 that can be used to facilitate routing and dispatch using a mass prediction model, according to some aspects of the disclosed technology. As discussed above, in some aspects mass data (provided by mass calculation models) may be used to facilitate vehicle mass predictions. For example, using vehicle mass data provided by mass calculation models, mass prediction models can be used to predict the needed weight capacity associated with a particular rider, for a particular ride (route). As such, mass prediction models may be based on data collected by mass calculation models deployed across one or more vehicles, for example, in an AV fleet.

As depicted in FIG. 4, system 400 includes a dispatch module 402 that is configured to perform vehicle route planning (and dispatch) based on a number of constraints, including AV capacity, predictions of rider needs (e.g., weight requirements), route information, and/or rider data, etc. Dispatch module 402 includes a mass prediction model 404, as well as a routing module 406. Mass prediction model 404 is configured to predict needed AV capacity based on routing data provided by routing module 406. As such, mass prediction model 404 and routing module 406 together provide the logic necessary to make dispatch decisions based on inferences regarding rider capacity needs and proximity, availability, and capabilities among vehicles in the AV fleet.

In practice, dispatch module 402 provides routing/dispatch instructions to one or more of AVs 410 (e.g., 4101, 4102 . . . 410N), via network 408. Measurements of vehicle mass (performed at the AV) can be communicated back to dispatch module 402, and mass prediction model 404, for example, as riders enter and disembark from the respective AV. As such, information regarding required vehicle capacities can be collected along different routes, and mass prediction model 404 can be updated in an ongoing manner, e.g., as additional vehicle mass measurements are collected across fleet 410.

By way of example, mass prediction module 404 may determine that capacity (weight) requirements for AVs providing airport pick-up, are more likely to be greater than those picking up at a restaurant location. As such, dispatch 402 may pair a vehicle with a greater carry capacity with an airport ride request, whereas a smaller capacity vehicle may be dispatched to the restaurant. In some implementations, information provided by the user/rider (e.g., destination location, or number of riders) may be used by mass prediction module 404 to predict capacity requirements. In instances where a vehicle is provided that is determined to be under-capacity, a user alert may be provided to indicate that one or more of the riders should disembark and that a higher capacity vehicle is to be automatically dispatched.

Figure 5:
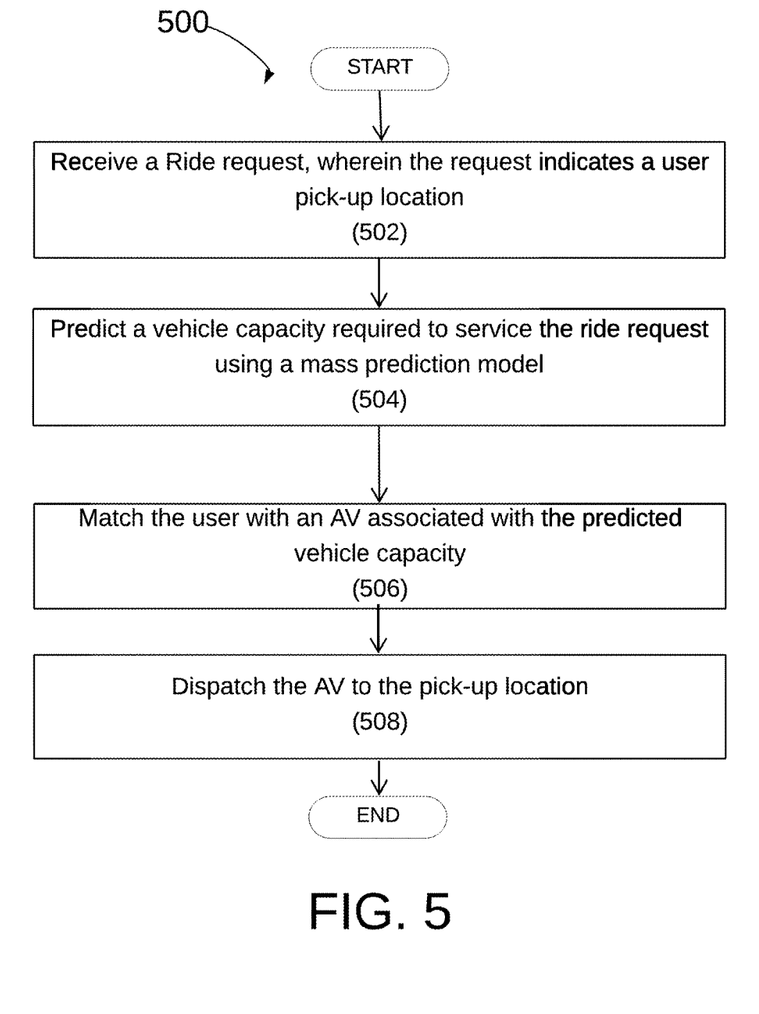
FIG. 5 illustrates steps of an example process for performing AV routing using a mass prediction model, according to some aspects of the disclosed technology.

FIG. 5 illustrates steps of an example process 500 for facilitating AV routing using a mass prediction model, according to some aspects of the disclosed technology. Process 500 begins with step 502 in which a ride request is received (e.g., at a dispatch system, such as dispatch module 402, discussed above). The ride request can include various types of information regarding the user (rider), including, but not limited to: a pick-up location, a drop-off location, and/or a number of riders/passengers to be transported.

In step 504, a vehicle capacity required to service the ride request is predicted, e.g., using a mass prediction model. In some aspects, the mass prediction model may be a machine-learning algorithm that is generated using vehicle mass calculations performed for a number of vehicles in an AV fleet. As such, the mass prediction model may be continuously updated (trained), for example, using federated learning techniques wherein data contributions from one or more AVs in an AV fleet are provided back to the mass prediction model.

In step 506, the requesting user (rider) is matched with an AV based on the predicted vehicle capacity requirements. In some aspects, rider/AV matching may be performed using historic data relating to past rides by the user, or by past rides by other riders that are similar to the user. For example, if historic user data indicates that the user has typically high vehicle capacity requirements, for example, because the user is frequently transporting cargo or luggage, then the user may be matched with a vehicle of greater carrying capacity.

In step 508, the matched AV is dispatched to the pick-up location. In some embodiments, vehicle mass calculations are performed once the rider and all other passengers have entered the AV. Further to the above examples, mass calculations can be performed based on changes in the AV pose that are detected using one or more environmental sensors, such as LiDAR sensors on the AV. Such mass calculations can be associated with the user and can be used to update the mass prediction model, as discussed in step 504, above.

Figure 6:
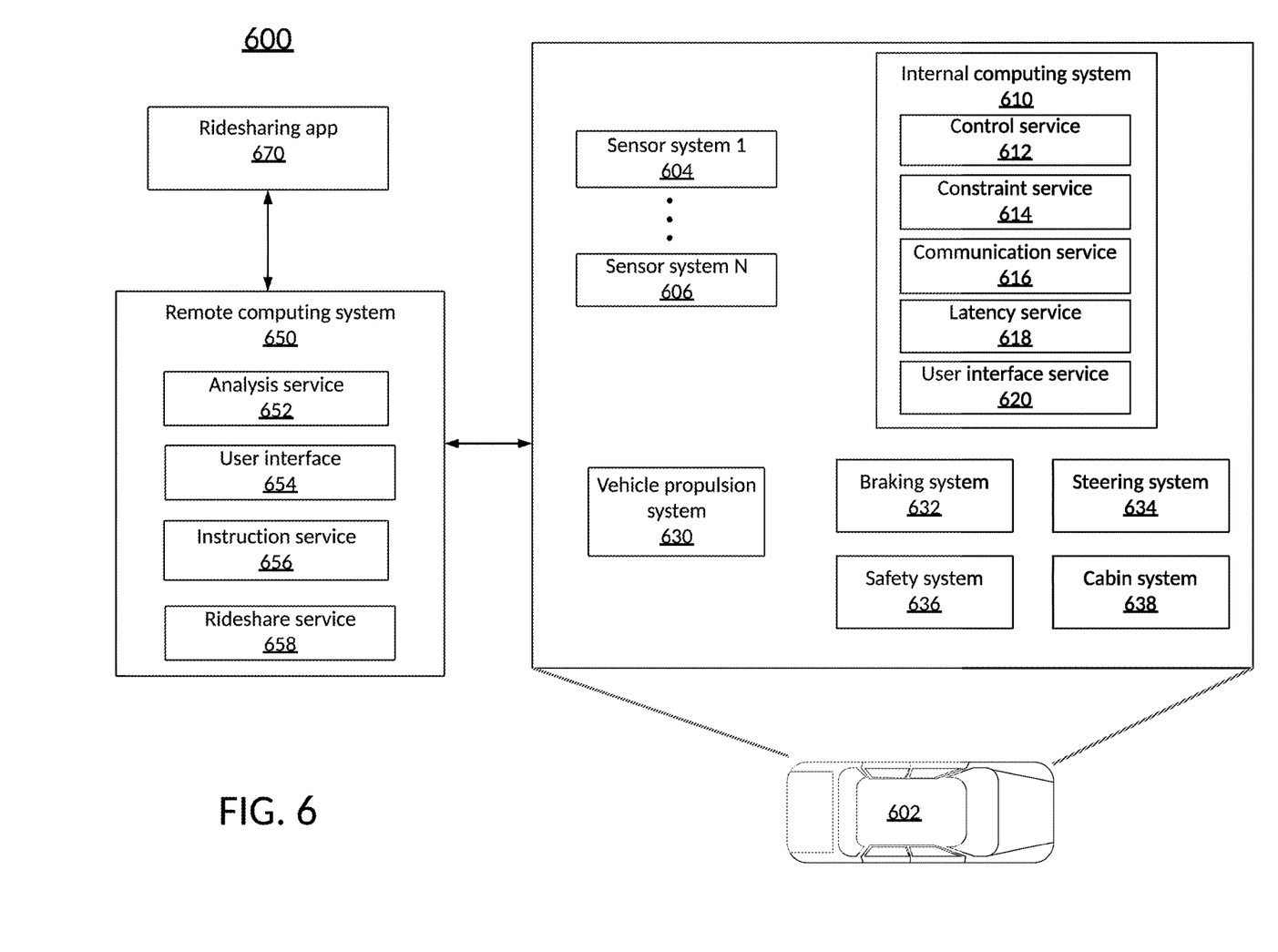
FIG. 6 illustrates an example system environment that can be used to facilitate AV dispatch and operations, according to some aspects of the disclosed technology.

FIG. 6 illustrates an example system environment that can be used to facilitate AV dispatch and operations, according to some aspects of the disclosed technology. Autonomous vehicle 602 can navigate about roadways without a human driver based upon sensor signals output by sensor systems 604-606 of autonomous vehicle 602. Autonomous vehicle 602 includes a plurality of sensor systems 604-606 (a first sensor system 604 through an Nth sensor system 606). Sensor systems 604-606 can be of different types and arranged about the autonomous vehicle 602. For example, the first sensor system 604 may be a camera sensor system and the Nth sensor system 606 may be a Light Detection and Ranging (LiDAR) sensor system. Other exemplary sensor systems include radio detection and ranging (RADAR) sensor systems, Electromagnetic Detection and Ranging (EmDAR) sensor systems, Sound Navigation and Ranging (SONAR) sensor systems, Sound Detection and Ranging (SODAR) sensor systems, Global Navigation Satellite System (GNSS) receiver systems such as Global Positioning System (GPS) receiver systems, accelerometers, gyroscopes, inertial measurement units (IMU), infrared sensor systems, laser rangefinder systems, ultrasonic sensor systems, infrasonic sensor systems, microphones, or a combination thereof. While four sensors 180 are illustrated coupled to the autonomous vehicle 602, it should be understood that more or fewer sensors may be coupled to the autonomous vehicle 602.

Autonomous vehicle 602 further includes several mechanical systems that are used to effectuate appropriate motion of the autonomous vehicle 602. For instance, the mechanical systems can include but are not limited to, vehicle propulsion system 630, braking system 632, and steering system 634. Vehicle propulsion system 630 may include an electric motor, an internal combustion engine, or both. The braking system 632 can include an engine brake, brake pads, actuators, and/or any other suitable componentry that is configured to assist in decelerating autonomous vehicle 602. In some cases, braking system 632 may charge a battery of the vehicle through regenerative braking. Steering system 634 includes suitable componentry that is configured to control the direction of movement of the autonomous vehicle 602 during navigation. Autonomous vehicle 602 further includes a safety system 636 that can include various lights and signal indicators, parking brake, airbags, etc. Autonomous vehicle 602 further includes a cabin system 638 that can include cabin temperature control systems, in-cabin entertainment systems, etc.

Autonomous vehicle 602 additionally comprises an internal computing system 610 that is in communication with sensor systems 680 and systems 630, 632, 634, 636, and 638. Internal computing system 610 includes at least one processor and at least one memory having computer-executable instructions that are executed by the processor. The computer-executable instructions can make up one or more services responsible for controlling autonomous vehicle 602, communicating with remote computing system 650, receiving inputs from passengers or human co-pilots, logging metrics regarding data collected by sensor systems 680 and human co-pilots, etc.

Internal computing system 610 can include a control service 612 that is configured to control operation of vehicle propulsion system 630, braking system 608, steering system 634, safety system 636, and cabin system 638. Control service 612 receives sensor signals from sensor systems 680 as well communicates with other services of internal computing system 610 to effectuate operation of autonomous vehicle 602. In some embodiments, control service 612 may carry out operations in concert one or more other systems of autonomous vehicle 602. Internal computing system 610 can also include constraint service 614 to facilitate safe propulsion of autonomous vehicle 602. Constraint service 616 includes instructions for activating a constraint based on a rule-based restriction upon operation of autonomous vehicle 602. For example, the constraint may be a restriction upon navigation that is activated in accordance with protocols configured to avoid occupying the same space as other objects, abide by traffic laws, circumvent avoidance areas, etc. In some embodiments, the constraint service can be part of control service 612.

The internal computing system 610 can also include communication service 616. The communication service 616 can include both software and hardware elements for transmitting and receiving signals from/to the remote computing system 650. Communication service 616 is configured to transmit information wirelessly over a network, for example, through an antenna array that provides personal cellular (long-term evolution (LTE), 3G, 4G, 5G, etc.) communication.

Internal computing system 610 can also include latency service 618. Latency service 618 can utilize timestamps on communications to and from remote computing system 650 to determine if a communication has been received from the remote computing system 650 in time to be useful. For example, when a service of the internal computing system 610 requests feedback from remote computing system 650 on a time-sensitive process, the latency service 618 can determine if a response was timely received from remote computing system 650 as information can quickly become too stale to be actionable. When the latency service 618 determines that a response has not been received within a threshold, latency service 618 can enable other systems of autonomous vehicle 602 or a passenger to make necessary decisions or to provide the needed feedback.

Internal computing system 610 can also include a user interface service 620 that can communicate with cabin system 638 in order to provide information or receive information to a human co-pilot or human passenger. In some embodiments, a human co-pilot or human passenger may be required to evaluate and override a constraint from constraint service 614, or the human co-pilot or human passenger may wish to provide an instruction to the autonomous vehicle 602 regarding destinations, requested routes, or other requested operations.

As described above, the remote computing system 650 is configured to send/receive a signal from the autonomous vehicle 640 regarding reporting data for training and evaluating machine learning algorithms, requesting assistance from remote computing system 650 or a human operator via the remote computing system 650, software service updates, rideshare pickup and drop off instructions, etc.

Remote computing system 650 includes an analysis service 652 that is configured to receive data from autonomous vehicle 602 and analyze the data to train or evaluate machine learning algorithms for operating the autonomous vehicle 602. The analysis service 652 can also perform analysis pertaining to data associated with one or more errors or constraints reported by autonomous vehicle 602. Remote computing system 650 can also include a user interface service 654 configured to present metrics, video, pictures, sounds reported from the autonomous vehicle 602 to an operator of remote computing system 650. User interface service 654 can further receive input instructions from an operator that can be sent to the autonomous vehicle 602.

Remote computing system 650 can also include an instruction service 656 for sending instructions regarding the operation of the autonomous vehicle 602. For example, in response to an output of the analysis service 652 or user interface service 654, instructions service 656 can prepare instructions to one or more services of the autonomous vehicle 602 or a co-pilot or passenger of the autonomous vehicle 602. Remote computing system 650 can also include rideshare service 658 configured to interact with ridesharing applications 670 operating on (potential) passenger computing devices. The rideshare service 658 can receive requests to be picked up or dropped off from passenger ridesharing app 670 and can dispatch autonomous vehicle 602 for the trip. The rideshare service 658 can also act as an intermediary between the ridesharing app 670 and the autonomous vehicle wherein a passenger might provide instructions to the autonomous vehicle to 602 go around an obstacle, change routes, honk the horn, etc. Remote computing system 650 can, in some cases, include at least one computing system 650 as illustrated in or discussed with respect to FIG. 6, or may include at least a subset of the components illustrated in FIG. 6 or discussed with respect to computing system 650.

Figure 7:
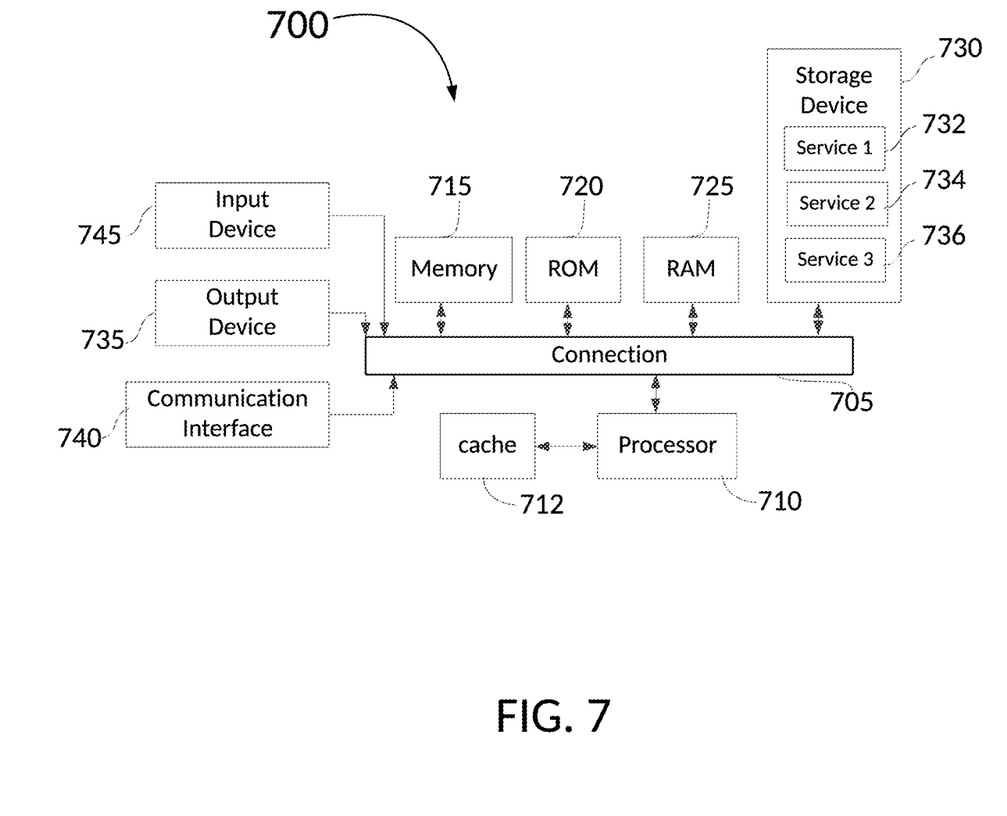
FIG. 7 illustrates an example processor-based system with which some aspects of the subject technology can be implemented.

FIG. 7 illustrates an example processor-based system with which some aspects of the subject technology can be implemented. For example, processor-based system 700 can be any computing device making up internal computing system 610, remote computing system 650, a passenger device executing the rideshare app 670, internal computing device 730, or any component thereof in which the components of the system are in communication with each other using connection 705. Connection 705 can be a physical connection via a bus, or a direct connection into processor 710, such as in a chipset architecture. Connection 705 can also be a virtual connection, networked connection, or logical connection.

In some embodiments, computing system 700 is a distributed system in which the functions described in this disclosure can be distributed within a datacenter, multiple data centers, a peer network, etc. In some embodiments, one or more of the described system components represents many such components each performing some or all of the function for which the component is described.

In some embodiments, the components can be physical or virtual devices.

Example system 700 includes at least one processing unit (CPU or processor) 710 and connection 705 that couples various system components including system memory 715, such as read-only memory (ROM) 720 and random access memory (RAM) 725 to processor 710.

Computing system 700 can include a cache of high-speed memory 712 connected directly with, in close proximity to, or integrated as part of processor 710.

Processor 710 can include any general purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 includes an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms known to those of skill in the art. In some instances, multimodal systems can enable a user to provide multiple types of input/output to communicate with computing system 700. Computing system 700 can include communications interface 740, which can generally govern and manage the user input and system output. The communication interface may perform or facilitate receipt and/or transmission wired or wireless communications via wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

Communication interface 740 may also include one or more Global Navigation Satellite System (GNSS) receivers or transceivers that are used to determine a location of the computing system 700 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 730 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

Storage device 730 can include software services, servers, services, etc., that when the code that defines such software is executed by the processor 710, it causes the system to perform a function. In some embodiments, a hardware service that performs a particular function can include the software component stored in a computer-readable medium in connection with the necessary hardware components, such as processor 710, connection 705, output device 735, etc., to carry out the function.

As understood by those of skill in the art, machine-learning based classification techniques can vary depending on the desired implementation. For example, machine-learning classification schemes can utilize one or more of the following, alone or in combination: hidden Markov models; recurrent neural networks; convolutional neural networks (CNNs); deep learning; Bayesian symbolic methods; general adversarial networks (GANs); support vector machines; image registration methods; applicable rule-based system. Where regression algorithms are used, they may include including but are not limited to: a Stochastic Gradient Descent Regressor, and/or a Passive Aggressive Regressor, etc.

Machine learning classification models can also be based on clustering algorithms (e.g., a Mini-batch K-means clustering algorithm), a recommendation algorithm (e.g., a Mini-wise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. A computer-implemented method, comprising:
measuring a first pose of an autonomous vehicle (AV) using one or more environmental sensors without driving the AV, wherein the first pose is associated with a first mass measurement of the AV, and wherein the first pose includes a roll and a pitch of the AV in the first pose;
measuring a second pose of the AV using the one or more environmental sensors without driving the AV, wherein the second pose is associated with a second mass measurement of the AV, and wherein the second pose includes a roll and a pitch of the AV in the second pose; and
generating a mass calculation model based on the first pose and the second pose.

2. The computer-implemented method of claim 1, further comprising:
calculating a total mass of the AV using the mass calculation model, wherein the total mass is different from the first mass measurement and the second mass measurement.

3. The computer-implemented method of claim 1, wherein the one or more environmental sensors comprises a Light Detection and Ranging (LiDAR) sensor.

4. The computer-implemented method of claim 1, wherein the one or more environmental sensors comprises a camera.

5. The computer-implemented method of claim 1, wherein the first pose of the AV corresponds with an unweighted state of the AV, and the second pose of the AV corresponds with a weighted state of the AV.

6. The computer-implemented method of claim 1, wherein measuring the first pose comprises:
   measuring a displacement of a suspension of the AV.

7. The computer-implemented method of claim 1, further comprising:
   identifying an output from the mass calculation based on a passenger being added or removed from the AV; and
   changing a routing or dispatch decision based on the output from the mass calculation model.

8. The computer-implemented method of claim 1, further comprising:
   predicting, using the mass calculation model, a required vehicle capacity for a ride associated with a certain location.

9. A system comprising:
   one or more processors;
   one or more environmental sensors coupled to the one or more processors; and
   a computer-readable medium comprising instructions stored therein, which when executed by the processors, cause the processors to perform operations comprising:
      measuring a first pose of an autonomous vehicle (AV) using the one or more environmental sensors without driving the AV, wherein the first pose is associated with a first mass measurement of the AV, and wherein the first pose includes a roll and a pitch of the AV in the first pose;
      measuring a second pose of the AV using the one or more environmental sensors without driving the AV, wherein the second pose is associated with a second mass measurement of the AV, and wherein the second pose includes a roll and a pitch of the AV in the second pose; and
      generating a mass calculation model based on the first pose and the second pose.

10. The system of claim 9, wherein the processors are further configured to perform operations comprising:
    calculating a total mass of the AV using the mass calculation model, wherein the total mass is different from the first mass measurement and the second mass measurement.

11. The system of claim 9, wherein the one or more environmental sensors comprises a Light Detection and Ranging (LiDAR) sensor.

12. The system of claim 9, wherein the one or more environmental sensors comprises a camera.

13. The system of claim 9, wherein the first pose of the AV corresponds with an unweighted state of the AV, and the second pose of the vehicle corresponds with a weighted state of the AV.

14. The system of claim 9, wherein measuring the first pose comprises:
    measuring a displacement of a suspension of the vehicle.

15. A non-transitory computer-readable storage medium comprising instructions stored therein, which when executed by one or more processors, cause the processors to perform operations comprising:
    measuring a first pose of an autonomous vehicle (AV) using one or more environmental sensors without driving the AV, wherein the first pose is associated with a first mass measurement of the AV, and wherein the first pose includes a roll and a pitch of the AV in the first pose;
    measuring a second pose of the AV using the one or more environmental sensors without driving the AV, wherein the second pose is associated with a second mass measurement of the AV, and wherein the second pose includes a roll and a pitch of the AV in the second pose; and
    generating a mass calculation model based on the first pose and the second pose.

16. The non-transitory computer-readable storage medium of claim 15, wherein the one or more processors are further configured to perform operations comprising:
    calculating a total mass of AV using the mass calculation model, wherein the total mass is different from the first mass measurement and the second mass measurement.

17. The non-transitory computer-readable storage medium of claim 15, wherein the one or more environmental sensors comprises a Light Detection and Ranging (LiDAR) sensor.

18. The non-transitory computer-readable storage medium of claim 15, wherein the one or more environmental sensors comprises a camera.

19. The non-transitory computer-readable storage medium of claim 15, wherein the first pose of the AV corresponds with an unweighted state of the AV, and the second pose of the AV corresponds with a weighted state of the AV.

20. The non-transitory computer-readable storage medium of claim 15, wherein measuring the first pose comprises:
    measuring a displacement of a suspension of the AV.

* * * * *